US006296905B1

(12) United States Patent
Slavid et al.

(10) Patent No.: US 6,296,905 B1
(45) Date of Patent: Oct. 2, 2001

(54) METHOD FOR PROTECTING AND CONSOLIDATING CALCAREOUS MATERIALS

(75) Inventors: Irving O. Slavid, Colebrook, CT (US); Norman R. Weiss, New York, NY (US)

(73) Assignee: MMC Materials, Incorporated, Colebrook, CT (US)

( * ) Notice: Subject to any disclaimer, the term of this patent is extended or adjusted under 35 U.S.C. 154(b) by 0 days.

(21) Appl. No.: 09/428,713

(22) Filed: Oct. 28, 1999

Related U.S. Application Data
(60) Provisional application No. 60/106,144, filed on Oct. 29, 1998.

(51) Int. Cl.$^7$ ........................................ B05D 5/00
(52) U.S. Cl. ..................... 427/301; 427/337; 427/399; 427/419.7
(58) Field of Search .................. 427/301, 337, 427/419.7, 226, 227, 399

(56) References Cited

U.S. PATENT DOCUMENTS

| | | |
|---|---|---|
| 3,577,244 | 5/1971 | Lewin ...................................... 106/12 |
| 3,998,878 | 12/1976 | Hearon et al. ....................... 260/536 |
| 4,444,924 | 4/1984 | Grimmer .............................. 523/445 |
| 4,478,911 | 10/1984 | Price .................................... 428/332 |
| 4,479,503 | 10/1984 | Pouchain et al. ........................ 134/2 |
| 4,509,983 | 4/1985 | Szabó et al. ......................... 106/38.2 |
| 4,738,876 | 4/1988 | George et al. ....................... 427/299 |
| 4,756,766 | 7/1988 | Thrower .................................. 134/3 |
| 4,764,431 | 8/1988 | Piacenti et al. ....................... 428/421 |
| 5,077,097 | 12/1991 | Moggi et al. ..................... 427/393.6 |
| 5,212,016 | 5/1993 | Mascia et al. ....................... 428/422 |
| 5,219,927 | 6/1993 | Moggi et al. ........................ 525/54.3 |
| 5,282,900 | 2/1994 | McDonell et al. ....................... 134/2 |
| 5,459,197 | * 10/1995 | Schwindt et al. .................... 524/591 |
| 5,490,883 | 2/1996 | McLaren et al. ......................... 134/3 |
| 5,631,312 | * 5/1997 | Takada et al. ............................ 524/5 |

FOREIGN PATENT DOCUMENTS

| | | |
|---|---|---|
| 0073157A | 3/1983 | (EP) . |
| 0207307A | 1/1987 | (EP) . |
| 0856501A1 | 8/1998 | (EP) . |
| 0900771A1 | 3/1999 | (EP) . |
| 93027595 | * 4/1993 | (JP) . |
| 10218687 | * 8/1998 | (JP) . |
| WO86/02922 | 5/1986 | (WO) . |

OTHER PUBLICATIONS

Lewis, Richard J. Hawley's Condensed Chemical Dictionary, Twelfth Edition, p. 1117, 1993 (no month).*

Lewin, S.Z., "The Preservation of Natural Stone, 1839–1965," Art and Archaeology Technical Abstracts, vol. 6, No.1 (Supplement) (1966).

Lewin, et al., "Rational of the Barium Hydroxide–Urea Treatment of Decayed Stone" Studies in Conservation, 19 (1974), pp. 24–35.

Winkler, E.M., "Stone: Properties, Durability in Man's Environment" Second, revised edition, Springer–Verlag, NY pp. 87–101.

Grissom, C.A., et al., "Alkoxysilanes in the Conservation of Art and Architecture: 1861–1981," Art and Archaeology Technical Abstracts, vol. 18, No. 1 (Supplement) (1981).

Winkler, E.M., "Testing Techniques for the Effectiveness of Stone Consolidants" 1984 APT Conference, Toronto, Canada, pp. 35–37.

Ganorkar, M.C., et al., "Deterioration and Conservation of Calcareous Stones", The Birla Institute of Scientific Research, Asmangadh Palace, Malakpet Hyderabad–500 036 India, ICOM Committee for Conservation, 1987, vol. II pp. 479–486.

Wheeler, G.S., et al., "Comparative Strengthening Effect of Several Consolidants on Wallace Standstone and Indiana Limestone", Copyright Laboratório Nacional de Engenharia Civil, 1992, ISBN 972–49–1483–6, pp. 1033–1041.

Schnabel, L. "Evaluation of the Barium Hydroxide–Urea Consolidation Method", Copyright Laboratório National de Engenharia Civil, 1992, pp. 1063–1072.

Tiano, P., et al., "Stone Reinforcement by Induction of Calcite Crystals Using Organic Matrix Macromolecules. Feasibility Study", Copyright Laboratório Nacional de Engenharia Civil, 1992, Proceedings of the 7$^{th}$ International Congress on Deterioration and Conservation of Stone, held in Lisbon, Portugal, Jun. 15–18, 1992, pp. 1317–1326.

Simon, S., et al., "The First Stages of Marble Weathering, Preliminary Results After Short–term Exposure of Nine Months", Conservation of Stone and other Materials, Edited by M.J. Thiel Copyright RILEM, Published by E & FN Spon, 2–6 Boundary Row, London SEI, 8HN, ISBN 0419 18840 *I (vol. 1)., pp. 52–58.

Goins, E.S., et al., "The Influence of Reaction Parameters on the Effectiveness of Tetraethoxysilane–based Stone Consolidants: Solvent Effects", International Colloquium, Methods of Evaluating Products for the Conservation of Porous Building Materials in Monuments, Rome 19–21 Jun. 1995, pp. 259–274.

(List continued on next page.)

Primary Examiner—Shrive Beck
Assistant Examiner—Kirsten A. Crockford
(74) Attorney, Agent, or Firm—Bromberg & Sunstein LLP (57) ABSTRACT

Embodiments provide methods for the protection and consolidation of calcareous materials. An exemplary method includes providing an aqueous solution of a hydroxycarboxylic acid, adjusting the pH of the aqueous solution by adding an alkaline agent, and applying the pH-adjusted aqueous solution to a calcareous mineral to form a conversion layer on the mineral. The calcareous mineral may, for example, be carbonate rock, particularly limestone and marble, or may be part of masonry material, aggregates, or fillers. Adherent conversion layers are readily formed at ambient temperatures and, therefore, methods provided are suitable for field application. Conversion layers so formed are provided as further embodiments.

48 Claims, 4 Drawing Sheets

OTHER PUBLICATIONS

Weiss, N.R., "Chemical Treatments for Masonry: An American History", APT Bulletin, The Journal of Preservation Technology, (Special Issue: Preservation of Historic Masonry) vol. XXVI, No. 4, APT 1996 Annual Conference Winnipeg, Sep. 25–29, pp. 9–16.

"Product Data, OH Consolidation Treatment (Stone Strengthener) Conservare", ProSoCo, Inc. Kansas City, MO., PD–OHCT–052196 Copyright ProSoCo, Inc. 1996.

Goins, E.S., et al., "Alokoxysilane Film Formation on Quartz and Calcite Crystal Surfaces", Proceedings of the 8$^{th}$ International Congress on Deterioration and Conservation of Stone, Berlin, 30. Sep. –4–Oct. 1996.

Nagy, K.L., et al., "Use of Coupled Passivants and Consolidants on Calcite Mineral Surfaces", Materials Research Society Symposium Proceedings vol. 462, Materials Issues in Art and Archaeology V, Symposium held Dec. 3–5, 1996, Boston, MA, pp. 301–306.

Brinker, C.J., et al., "Sol–Gel Preservation of Mankind's Cultural Heritage in Objects Constructed of Stone", SAND98–0251 Unlimited Release Printed Jan. 1998, Distribution Category UC–704, pp. 3–35.

* cited by examiner

METHOD FOR PROTECTING AND CONSOLIDATING CALCAREOUS MATERIALS

RELATED U.S. APPLICATION

The present application claims priority from U.S. Provisional Application Ser. No. 60/106,144, filed on Oct. 29, 1998, which is hereby incorporated herein by reference.

TECHNICAL FIELD

This invention relates to the protection and consolidation of materials comprising alkaline calcareous minerals, especially limestones and marbles.

BACKGROUND ART

It is well established that the deterioration of alkaline calcareous masonry materials incorporated, for example, into buildings, engineering structures, public and funerary monuments and outdoor sculpture is associated with chemical weathering. For architectural and sculptural stone, the principal mechanism of chemical weathering is acidic dissolution of the carbonate minerals calcite and aragonite (calcium carbonate) and dolomite (calcium magnesium carbonate). In rural areas, the acidity of fog, rainwater and snow may be limited by the solubility of carbon dioxide. Considerably lower values of pH (representing greater acidity) are recorded in urban industrialized areas, where sulfur dioxide is more abundant, is readily oxidized by ozone and nitrogen oxides, and the resultant sulfur trioxide dissolves in water to form sulfuric acid. The macroscopic results of acidic attack include erosion of stone profiles and of surface tooling and carving, loss of polish, the progressive illegibility of inscriptions, and dramatic disintegration.

Much of the prior art with regard to protection of calcareous stone has relied upon the use of film-forming sealers, including those based upon drying oils, plant resins, shellac, waxes, and more recently (that is, since the Second World War) acrylics and epoxies. Total failure of such sealer-based systems via entrapment of moisture behind the film is common, as is the embrittlement, clouding and discoloration of the films upon environmental exposure to ultraviolet radiation. Similarly poor results have been reported with regard to the application of water-repellents (such as stearates, silicones and fluoropolymers), largely because of their inability to remain attached to the chemically dynamic carbonate minerals outdoors.

Where deterioration has advanced to the stage of significant reduction of cohesive properties, attempts have been made to utilize many of the organic treatments noted above as consolidants (strengtheners). For solution polymers, entry into the weakened pore structure of the stone is typically impeded by the tendency of solvent evaporation to limit deposition of the consolidant to a zone near the stone surface. With chemically curing resin systems (such as two-part epoxies), their high viscosity is a critical factor, resulting in insufficient penetration and, therefore, poor performance.

Progress in the consolidation of deteriorated masonry materials with commercial strengthening formulations based on tetraethyl orthosilicate (TEOS) has been substantial since the early 1970's. Hydrolysis and condensation of this low viscosity liquid (sometimes blended with alkyltrialkoxysilanes to impart water-repellency to the cured consolidant) results in the formation of glassy deposits of silica. Unfortunately, the results achieved for the preservation of sandstones, brick, and other silicate building materials have not been equaled for carbonate-containing rocks. In fact, carbonate minerals have recently been shown to be anticatalytic to the formation of silicate polymers derived from TEOS. Use of TEOS-based products is claimed to result in improved cohesion of deteriorated stone as a result of the development of chemical bonds to the stone surface. It is firmly believed that such bond formation requires hydroxyl groups, which are largely absent in calcite, aragonite and dolomite.

Other methods historically proposed and/or utilized for the preservation of limestones and marbles include the reaction of the carbonate minerals with aqueous solutions of fluorides, fluorosilicates, and barium hydroxide. Published results of both laboratory and field testing of these formulations strongly suggest that they are of questionable value, especially for marble.

Since the 1960's, there has been a great deal of research on the response of calcium hydroxide (synthetic portlandite) in concrete and other cement-based composites to environmental acidity. The dissolution of portlandite weakens the microstructure of these materials. The calcium carbonate that typically forms as a result of this process (called carbonation) is, itself, sensitive to acidic conditions and is susceptible to further attack (sulfation).

SUMMARY OF THE INVENTION

An embodiment of the present invention provides a method of forming a conversion layer on an alkaline calcareous mineral. The method includes adjusting the pH of an aqueous solution of a hydroxycarboxylic acid by adding an alkaline agent. It includes applying the pH-adjusted aqueous solution to the calcareous mineral. In another embodiment, the method further includes rinsing the calcareous mineral with a secondary solution after applying the pH-adjusted aqueous solution. The aqueous solution may contain L-(+)-tartaric acid, the alkaline agent may contain ammonium hydroxide, and the secondary solution may contain calcium hydroxide. The concentration of L-(+)-tartaric acid is typically within a range between approximately 0.06 mols per liter and approximately 0.25 mols per liter. In one exemplary embodiment, the concentration of L-(+)-tartaric acid is approximately 0.16 mols per liter. In one embodiment, the pH of the pH-adjusted solution is typically between approximately 2.8 and approximately 5.0. In other embodiments, the pH of the pH-adjusted solution is between approximately 3.4 and approximately 5.0, or is approximately 3.9. A conversion layer so formed is provided in additional embodiments of the invention. The conversion layer may include an alkaline earth tartrate hydrate or, more specifically, calcium tartrate tetrahydrate.

In accordance with another embodiment, a method of forming a conversion layer on an alkaline calcareous mineral included in a masonry material is provided. The method includes combining an alkaline agent and an aqueous solution of a hydroxycarboxylic acid resulting in a pH-adjusted aqueous solution and applying the pH-adjusted aqueous solution to the material. The method may further include rinsing the calcareous material with a secondary solution.

In yet another embodiment, a method of treating a material comprising an alkaline calcareous mineral is provided. This method includes forming a conversion layer on the mineral and employing a formulation that chemically bonds with the conversion layer. The conversion layer may act as a primer, enhancing adhesion of other substances to the material. The formulation employed may include an alkoxysilane consolidant. The formulation may include a water-repellant.

In accordance with another embodiment, the conversion layer acts to passivate an alkaline calcareous mineral for protection against acidic attack.

In a further embodiment, a method of treating a material having a plurality of abutting alkaline calcareous mineral grains is provided. The method includes applying a pH-adjusted aqueous solution of a hydroxycarboxylic acid to the material and forming a conversion layer on each of the abutting grains such that the conversion layer consolidates the abutting grains, resulting in strengthening of the material. The method may further include rinsing the calcareous material with a secondary solution. The pH-adjusted aqueous solution may contain L-(+)-tartaric acid, its pH may be between approximately 2.8 and approximately 5.0, and the secondary solution may contain calcium hydroxide.

DETAILED DESCRIPTION OF SPECIFIC EMBODIMENTS

Embodiments of the present invention provide methods that form a conversion layer on the surface of alkaline calcareous minerals. The conversion layer is well adhered. It is rapidly formed at ambient temperatures. As an aqueous solution is used to form the layer, penetration of the treatment into masonry materials comprising such minerals is considerable, particularly if the material is significantly deteriorated. The newly formed chemical phase which makes up the conversion layer is shown to be hydroxy-functional, permitting reaction with TEOS-based consolidants, and with alkylalkoxysilanes and other reactive water-repellents. Rinsing with a secondary solution is shown to be useful, particularly on dolomite, because of the somewhat higher solubility of magnesium-containing reaction products. The secondary solution is also an aqueous solution. The conversion layer is acid-resistant and, when uniformly deposited, acts as a passivator, to provide protection from acid rain attack. As it is formed from the existing mineral surfaces, the conversion layer also serves to cement mineral grains together, by intergrowth, at points of grain contact. For some alkaline calcareous masonry materials, such intergrowth leads to a consolidating or strengthening effect, even in the absence of TEOS-based consolidants.

Although embodiments of the present invention result from research on the chemical preservation of limestone and marble, the process is applicable to all alkaline calcareous masonry materials. This includes (in addition to the carbonate rocks limestone and marble) mortar, stucco, plaster, cast-in-place concrete, cement-based block (CMU), glass fiber reinforced cement (GFRC) products and architectural precast panels. The treatment is also applicable to carbonate mineral aggregates and fillers, which are utilized in the aforementioned lime- and/or cement-based products, and in plastics, paints, caulks, sealants, block fillers and joint compounds.

The conversion layer is formed via a chemical reaction between calcite or aragonite (calcium carbonate), dolomite (calcium magnesium carbonate) or synthetic portlandite (calcium hydroxide) and pH-adjusted aqueous solutions of hydroxycarboxylic acids. Those acids include, but are not limited to, glycolic, lactic, malic and tartaric acids. The formation of the conversion layer takes place at ordinary ambient temperatures and the treatment is thus particularly suited for field application to architectural and sculptural materials. The reaction product is a conversion layer that is highly insoluble and well adhered, having active bonding sites. These sites promote more successful use of alkoxysilanes, including TEOS-based consolidants and alkyltrialkoxysilane (or other reactive) water-repellents. Evidence of the creation of bonding sites is to be found in the results of silicate film adhesion tests (described below as Examples 4 and 5) and strength measurements (see Examples 6 and 10), and in the distinctly different wetting characteristics of the conversion layer versus that of calcite (see Example 3).

In an exemplary embodiment, stable conversion layers are formed by reaction with aqueous solutions derived from L-(+)-tartaric acid. The chemical formula for tartaric acid is:

On calcite, the conversion reaction may be understood to proceed as follows:

TARTRATE ION+CALCITE/ARAGONITE+WATER

CALCIUM TARTRATE TETRAHYDRATE+CARBONATE ION

Useful solutions may be prepared with L-(+)-tartaric acid at tartrate ion concentrations ranging from approximately 0.06 to approximately 0.25 mols per liter. pH-adjusted formulations are demonstrably reactive at pH values of between approximately 2.8 and approximately 5.0; the adjustments are effectuated by the addition of an alkaline agent, namely, concentrated ammonium hydroxide. Other suitable alkaline agents known in the art may be used. A narrower pH range of approximately 3.4 to 5.0 was established by observing gas evolution during test applications of the tartrate solutions to finely divided reagent grade calcium carbonate (no less than 99% passing a No. 100 screen, see Example 2, Table II). A pH of 3.9 at a tartrate ion concentration of 0.16 M, was determined to be an exemplary embodiment from the monitoring of pH during stirred treatment of screened calcite and dolomite marble aggregates, as described in Example 7.

As the solubility of L-(+)-tartaric acid in water at room temperature is quite high, it would seem possible to utilize a wide range of solution concentrations. However, very low tartrate ion concentrations do not result in the formation of a uniformly deposited conversion layer in a reasonable period of time. High concentrations are quite acidic and are, therefore, too aggressive to alkaline calcareous minerals. Digestion of these mineral surfaces during formation of the conversion layer compromises adhesion of the latter and acts to loosen individual grains. This is counterproductive to the utilization of the treatment on deteriorated masonry. Furthermore, evolution of carbon dioxide gas (from carbonate minerals) during application of such highly concentrated solutions of L-(+)-tartaric acid creates a back-pressure within the pore structure of the material being treated. As a result, the depth of penetration of the solution is reduced considerably. Additionally, upward adjustment of the pH by additional ammonium hydroxide adversely affects the reaction kinetics leading to the formation of the conversion layer. Therefore, there is a practical upper pH limit, particularly in applications for which the time required to form a stable conversion layer should be minimized.

Conversion treatment research was carried out on transparent crystals of calcite (Iceland spar) averaging 30 mm by 40 mm, and 14 mm in thickness. On these crystals, formation of the conversion layer may be readily observed with the naked eye. An initial problem was the difficulty of wetting the mineral surface. Useful solutions were prepared with an alcohol alkoxylate surfactant such as Triton XL-80N, at concentrations ranging from 0.02 to 0.15% (v/v). Verification of the reaction to form the conversion layer on the calcite crystals was made by identification of calcium tartrate tetrahydrate (JCPDS no. 26-330) via computer-interpreted x-ray diffraction (XRD) analysis.

During conversion treatment research directed toward dolomite, the greater solubility of magnesium tartrate hydrates, when compared with calcium tartrate tetrahydrate, needed to be addressed. Another embodiment of the methodology of conversion layer formation includes the use of a secondary solution. Limewater was successfully used as the secondary solution. Limewater is easily prepared from commercial grades of high calcium hydrated lime, an inexpensive material in common use in the agricultural and chemical industries. It is a saturated aqueous solution of calcium hydroxide. The saturation concentration is dependent on temperature. At room temperature, for example, the concentration is approximately 0.87 g/l.

Deep treatment with the secondary solution (after initial application of the tartrate solution) by rinsing a masonry surface including dolomite results in the double decomposition of the magnesium tartrate hydrates into the more stable calcium tartrate tetrahydrate and magnesium hydroxide (the latter is highly insoluble). Excess tartaric acid and/or mono- or diammonium tartrate that may remain from the primary treatment is consumed by precipitation of additional calcium tartrate tetrahydrate. This precipitation minimizes the formation of efflorescence directly associated with unreacted tartrates. This reaction can be understood as:

DIAMMONIUM TARTRATE+CALCIUM HYDROXIDE+WATER [OOCCH(OH)CH(OH)COO](NH$_4$)$_2$+Ca$^{++}$+2 OH+4H$_2$O⇨Ca[OOCCH(OH)CH(OH)COO].4H$_2$O+2H$_2$O+ 2NH$_3$ CALCIUM TARTRATE TETRAHYDRATE+WATER+ AMMONIA

Evolution of ammonia gas at this point can be quite noticeable by odor. As field differentiation of calcite from dolomite is often difficult, and both minerals sometimes occur within the same material, rinsing with the secondary solution should be routinely performed.

For a more detailed understanding with regard to calcareous stone (and to aggregates and fillers derived therefrom), reference is made to the following examples of research. They are presented herein for illustrative purposes only.

EXAMPLE 1

Over one hundred and seventy Iceland spar (calcite) crystals have been treated by partial immersion in pH-adjusted aqueous tartrate solutions at room temperature (22° C.). These crystals, averaging 30 mm by 40 mm, and 14 mm in thickness, are from Creel (Chihuahua), Mexico. Most specimens were given two or three immersions, each in fresh solution. They were patted dry (with paper towelling) between immersions, rinsed with water after the final immersion, patted again, and allowed to air dry. Typical times for each immersion were between 1 and 16 minutes. pH of the test solutions ranged from 1.7 to 5.0, with tartrate ion concentrations ranging from 0.10 to 0.41 mols per liter. Criteria for judgment of the conversion treatment included uniformity of the layer, optical properties (variations of translucency), and adhesion. These characteristics were studied under a stereobinocular microscope at 7–30× magnification. Adhesion was assessed by the raggedness of the edges of scratches made through the layer with a steel stylus. This evaluation was done after air drying, which was visually judged to be complete approximately thirty minutes after water rinsing. Several of the test solutions gave excellent conversion layers with two or three immersions of at least four minutes per immersion. Representative observations and data for specimens treated with two four-minute immersions are presented in Table I, organized by pH.

TABLE I (Refer to Example 1)

| pH | Tartrate ion, M | Uniformity | Optical properties | Adhesion |
|---|---|---|---|---|
| 2.13 | .410 | poor/variable | translucent | poor |
| 2.38 | .310 | poor/variable | translucent | poor |
| 2.75 | .210 | poor | transparent | N/A |
| 2.90 | .100 | complete | nearly opaque | very good |
| 3.02 | .215 | complete | nearly opaque | very good |
| 3.16 | .152 | complete | nearly opaque | excellent |
| 3.18 | .175 | complete | nearly opaque | very good |
| 3.40 | .152 | complete | translucent | very good |
| 3.45 | .110 | complete | translucent | very good |
| 3.52 | .175 | complete | nearly opaque | excellent |
| 3.62 | .115 | complete | poorly translucent | very good |
| 3.94 | .175 | complete | nearly opaque | excellent |
| 4.63 | .245 | complete | poorly translucent | very good |
| 4.85 | .250 | fair | nearly transparent | poor |
| 5.02 | .120 | barely visible | transparent | N/A |

EXAMPLE 2

The fourteen representative pH-adjusted aqueous tartrate solutions listed in Table I were reacted with finely divided, reagent grade calcium carbonate (no less than 99% passing a No. 100 screen). Observations of gas evolution are presented in Table II. A narrowed, practical pH range of approximately 3.4 to 5.0 was established. At pH values of less than 3.4, moderate to vigorous gas evolution was observed. Such gas evolution is counterproductive to the utilization of such solutions on deteriorated masonry comprising alkaline calcareous minerals.

TABLE II (Refer to Example 2)

| pH | Tartrate ion, M | Observations of gas evolution |
|---|---|---|
| 2.13 | .410 | vigorous |
| 2.38 | .310 | vigorous |
| 2.75 | .210 | vigorous |
| 2.90 | .100 | moderate |
| 3.02 | .215 | moderate |
| 3.16 | .152 | moderate |
| 3.18 | .175 | moderate |
| 3.40 | .152 | slight |
| 3.45 | .110 | slight |
| 3.52 | .175 | slight |
| 3.62 | .115 | very slight |
| 3.94 | .175 | very slight |
| 4.63 | .245 | none |
| 4.85 | .250 | none |
| 5.02 | .120 | none |

EXAMPLE 3

Drops of sulfuric acid at concentrations of 0.001 M (pH 2.9) and 0.01 M (pH 2.0) were placed on more than thirty treated Iceland spar crystals, and on more than twenty untreated controls. Conversion treatment was performed by immersion (two four-minute immersions) in many pH-adjusted aqueous tartrate solutions. Test solutions that seemed most promising were determined from Examples 1 and 2. In particular, solutions having a tartrate ion concentration of 0.175 M and pH ranging from 3.2 to 3.9 were used. Observation of the results was made with a stereobinocular microscope and with the unaided eye. Etching of the controls occurred within a few minutes, at both sulfuric acid concentrations. The effects of acid contact are more difficult to assess on treated crystals because the optical properties of the conversion layer are similar to those of an acid-etched crystal. The acid drops were therefore allowed to evaporate (overnight) to dryness.

First, no damage to the conversion layers was observed, even when examined in raking illumination. Second, a dramatic difference in contact angle between controls and treated samples was observed. This difference is indicative of the hydroxy-functional nature of the calcium tartrate tetrahydrate conversion layer. Treated crystals were repeatedly washed to verify that the contact angle difference was not attributable to residual surfactant.

EXAMPLE 4

Individual Iceland spar (calcite) crystals were treated with two pH-adjusted tartrate test solutions; the first was 0.10 M at a pH of 2.9, while the second was 0.175 M at a pH of 3.9. Conversion treatment was with three four-minute immersions following the general procedure described in Example 1. A commercial TEOS-based consolidant (Conservare OH, supplied by Prosoco, Inc., Lawrence, Kans., denoted "OH"), designed to deposit glassy silica, was applied by brush to a single treated face of each crystal. The same consolidant was brushed on untreated crystals as controls. The OH consolidant was allowed to cure for at least two weeks. When touched lightly with a wooden probe, all cured silicate films on the controls were found to be unattached to the calcite. Without exception, cured silicate films on treated crystals (with a conversion layer) were, by contrast, very well adhered.

EXAMPLE 5

At least twenty-four Iceland spar (calcite) crystals were treated (three four-minute immersions) with a pH-adjusted aqueous tartrate solution of 0.175 M and a pH of 3.9. After sufficient drying, the crystals were bound together in pairs ("couplets"), with similarly-sized faces in contact. Six couplets of untreated crystals were assembled as experimental controls. The commercial TEOS-based consolidant (Conservare OH) utilized in the experiments described in Example 4 was fed into the edge of the minute gap between the bound crystals, the liquid being drawn in by capillarity. For some couplets, this was done a single time; for others, OH was introduced weekly over a period of more than twenty-eight days. All assembled couplets were allowed to cure undisturbed for at least two weeks after the final application of the Conservare OH. The bindings were then cut. Untreated couplets showed no evidence of attachment. Couplets made of treated crystals were well adhered and could be handled without caution.

EXAMPLE 6

Figure 1:
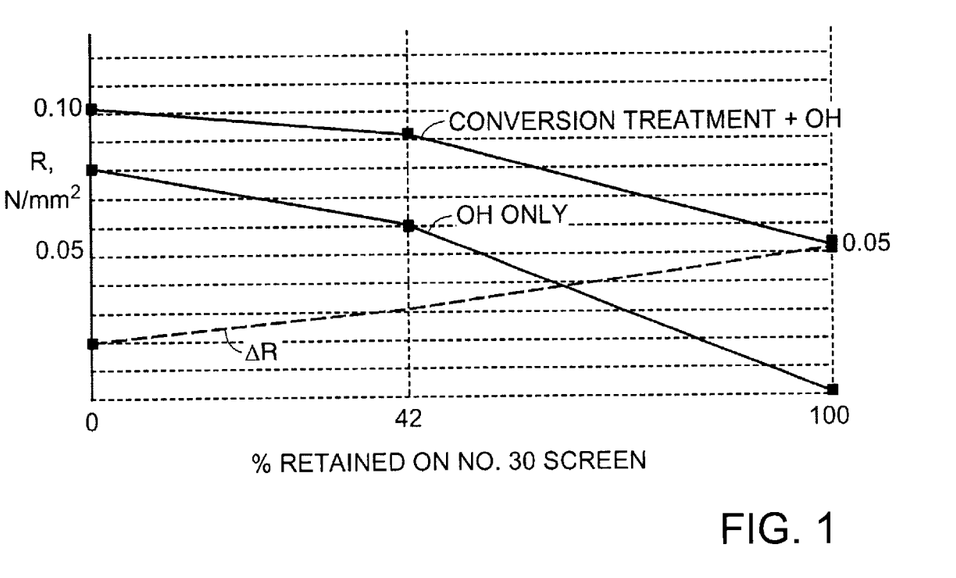
FIG. 1 is a plot of modulus of rupture, R, versus % aggregate retained; the plot derived from the data of Table III.

Crushed dolomite marble aggregate (MarbleMix DF-1000, Specialty Minerals, Canaan, Conn.) was screened to provide two batches: the first, passing a No. 30 screen; the second, retained on the No. 30 screen. A third batch utilized the aggregate as received (42% retained on the No. 30 screen). Half of each batch was treated with a pH-adjusted aqueous tartrate solution of 0.10 M at a pH of 2.9. The treatment included four four-minute stirred baths, the first three baths of tartrate solution, the last bath of saturated aqueous calcium hydroxide (secondary solution). The other half of each batch was kept as a control, creating a total of six test groups of aggregates. Twelve to fifteen weighed samples of each of the six test groups were mixed to an essentially uniform paste consistency with appropriate amounts of Conservare OH, and the paste placed into 60 mm diameter polystyrene petri dishes. The filled dishes were allowed to cure indoors, uncovered, for two weeks, at which time an additional 6 ml of OH was added to each dish. After a further two weeks, fifty-two petri dishes were lightly scored on their edges, and the cast disks un-molded. For the untreated aggregate retained on No. 30 screen, there was no consolidating effect at all with OH. These samples disintegrated during un-molding. The other five sets of samples held together well, and were tested for modulus of rupture (R, in $N/mm^2$), utilizing an apparatus described elsewhere by E. M. Winkler in *APT Bulletin, XVII* (2), 35–37 (1985). Data are presented in Table III and R is plotted from thie data in FIG. 1. Carbonate mineral aggregates treated with the tartrate solution created significantly stronger disks, with greater increases in flexural strength as the aggregate size was increased. For the sets that utilized unscreened aggregate, there was a 51% increase in flexural strength as a result of the conversion treatment.

TABLE III (Refer to Example 6)

| | % Retained on No. 30 | Number of samples | Mean load, N | R, $N/mm^2$ | $\Delta R$, $N/mm^2$ |
|---|---|---|---|---|---|
| Untreated | 0 | 10 | 24.5 | 0.081 | |
| Treated | 0 | 6 | 30.8 | 0.102 | .021 (26%) |
| Untreated | 42 | 10 | 18.5 | 0.061 | |
| Treated | 42 | 8 | 27.8 | 0.092 | .031 (51%) |
| Untreated | 100 | 8 | (0) | (0) | |
| Treated | 100 | 10 | 15.3 | 0.051 | .051 (N.A.) |

EXAMPLE 7

Figure 2:
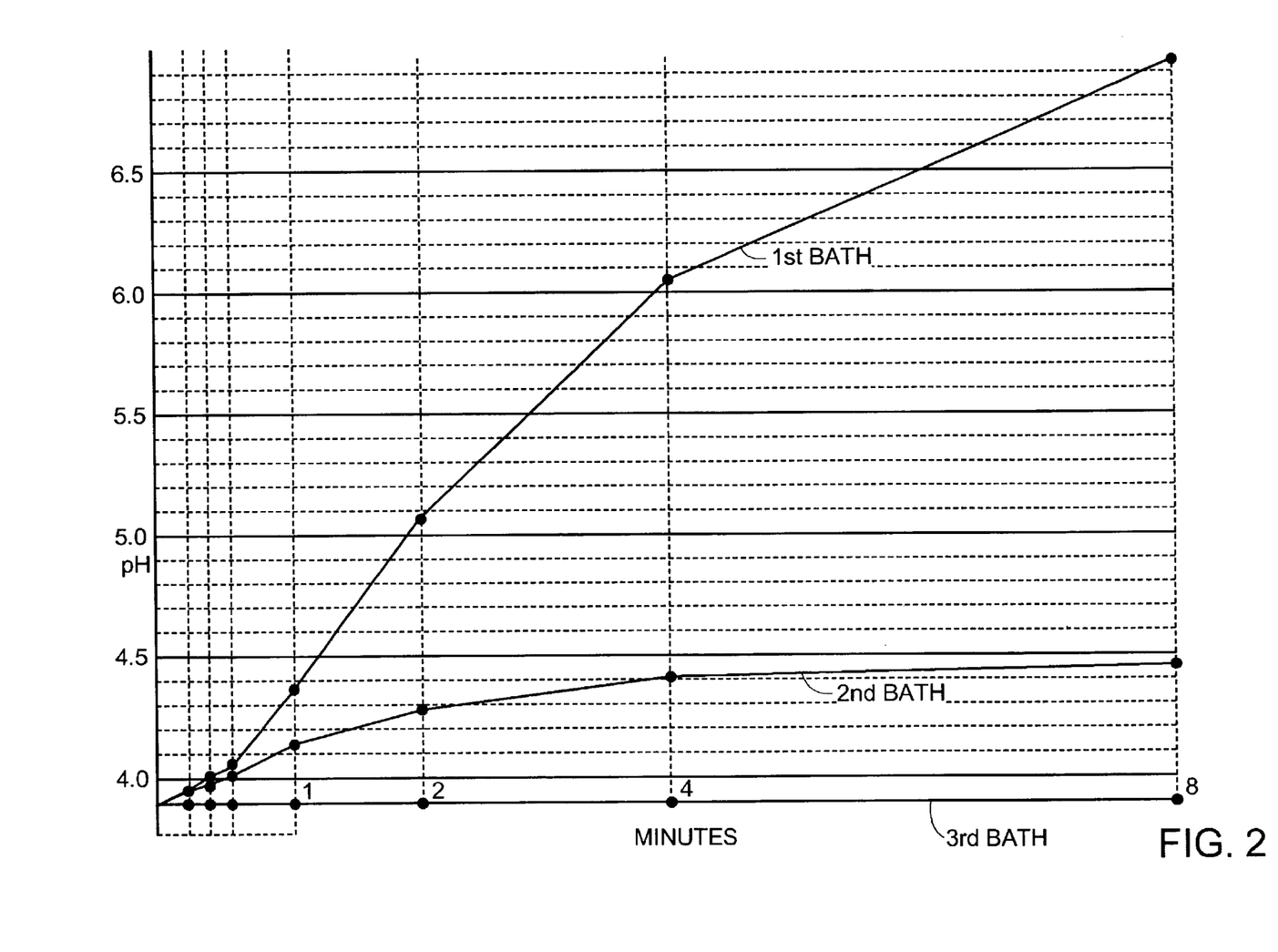
FIGS. 2–4 are plots of monitored pH versus time. The plot of FIG. 2 is derived from the data of Table IV for calcite, the plot of FIG. 3 is derived from the data of Table V for dolomite and the comparative plot of FIG. 4 is derived from the data of Table VI for treated and untreated aggregate.
Figure 3:
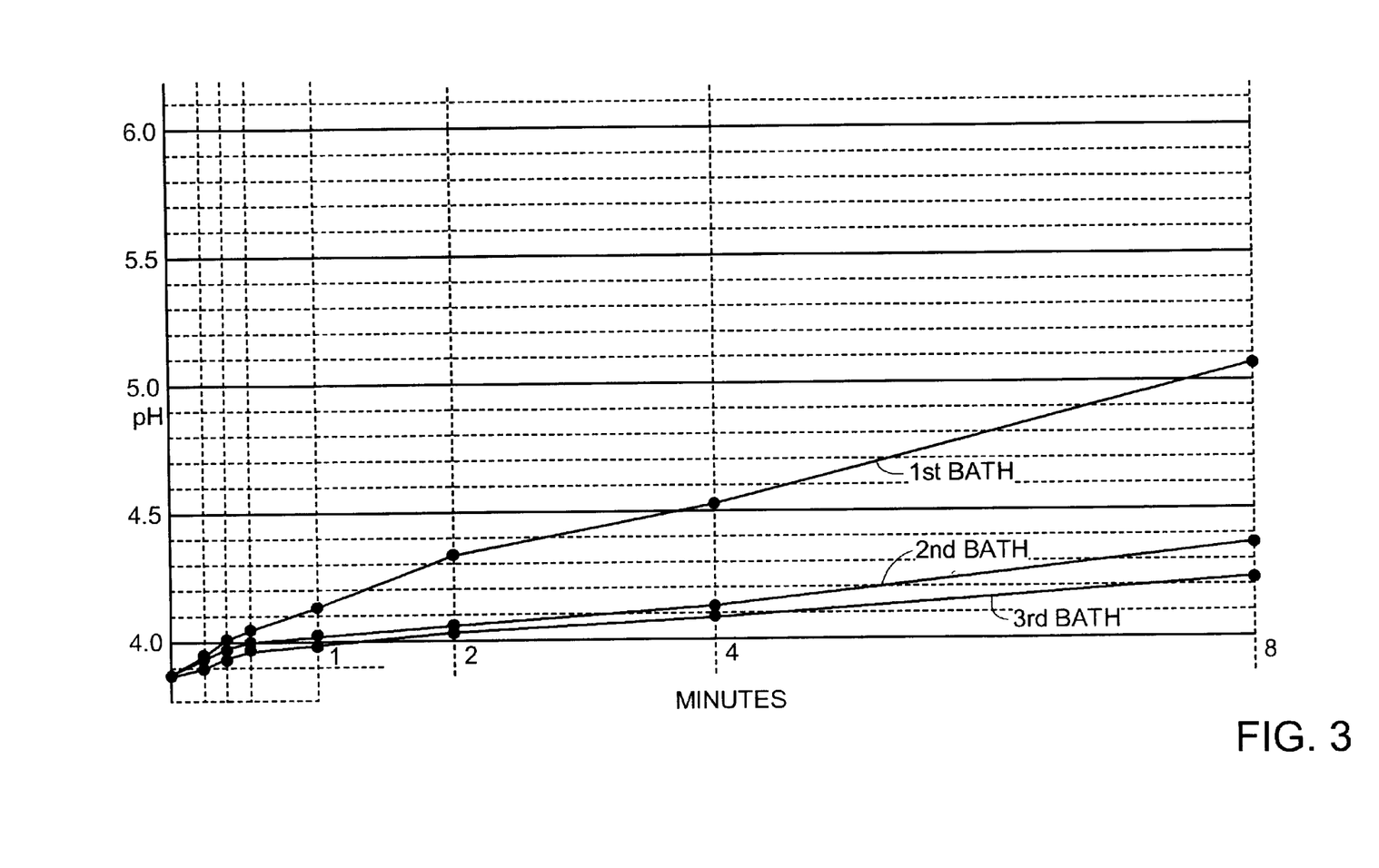

Crushed dolomite marble (MarbleMix DF-1000) and calcite marble (AFG 10–40, Specialty Minerals, Adams, Mass.) aggregates were water washed and dried, and screened to pass a No. 50 screen and be retained on a No. 100 screen. For calcite, 4 g of aggregate was treated with 20 ml of a tartrate solution of 0.16 M at a pH of 3.9, with continuous stirring for eight minutes. The solution was decanted, the aggregate dried, and the process repeated twice, each time with fresh solution. pH was monitored with a digital meter as a function of time, and the data plotted. The pH electrode was in the stirring bath continuously during each eight-minute period. The same procedure was carried out with dolomite, stirring 20 g into 20 ml of the same treatment solution. Mean data from triplicate experiments are presented graphically (FIG. 2 - calcite and FIG. 3 - dolomite) and in tabular form in Tables IV (calcite) and V (dolomite). Increasing pH represents neutralization of the tartrate solution by reaction with the alkaline carbonate minerals. With repeated treatment on the same particles, the increase is progressively less, as there are fewer tartrate-reactive locations left on the mineral surfaces. In other words, the conversion treatment becomes more complete. The need to use a larger amount of dolomite to observe this process is consistent with the greater resistance of dolomite (versus calcite) to acidity, as commonly reported in the literature.

TABLE IV (Refer to Example 7)

| | 1st Bath | | | |
|---|---|---|---|---|
| Time elapsed | pH | Average deviation | 2nd Bath pH | 3rd Bath pH |
| 10 sec | 3.95 | .01 | 3.96 | 3.90 |
| 20 sec | 4.01 | .01 | 4.00 | 3.90 |
| 30 sec | 4.06 | .01 | 4.03 | 3.90 |
| 1 min | 4.37 | .02 | 4.15 | 3.91 |
| 2 min | 5.06 | .02 | 4.29 | 3.91 |
| 4 min | 6.02 | .06 | 4.41 | 3.91 |
| 8 min | 6.91 | .01 | 4.45 | |

TABLE V (Refer to Example 7)

| | 1st Bath | | | |
|---|---|---|---|---|
| Time elapsed | pH | Average deviation | 2nd Bath pH | 3rd Bath pH |
| 10 sec | 3.93 | .01 | 4.01 | 3.96 |
| 20 sec | 3.99 | .01 | 4.02 | 3.98 |
| 30 sec | 4.05 | .01 | 4.02 | 3.98 |
| 1 min | 4.16 | .00 | 4.06 | 4.00 |
| 2 min | 4.31 | .00 | 4.09 | 4.03 |
| 4 min | 4.53 | .02 | 4.17 | 4.11 |
| 8 min | 5.03 | .04 | 4.35 | 4.26 |

EXAMPLE 8

Figure 4:
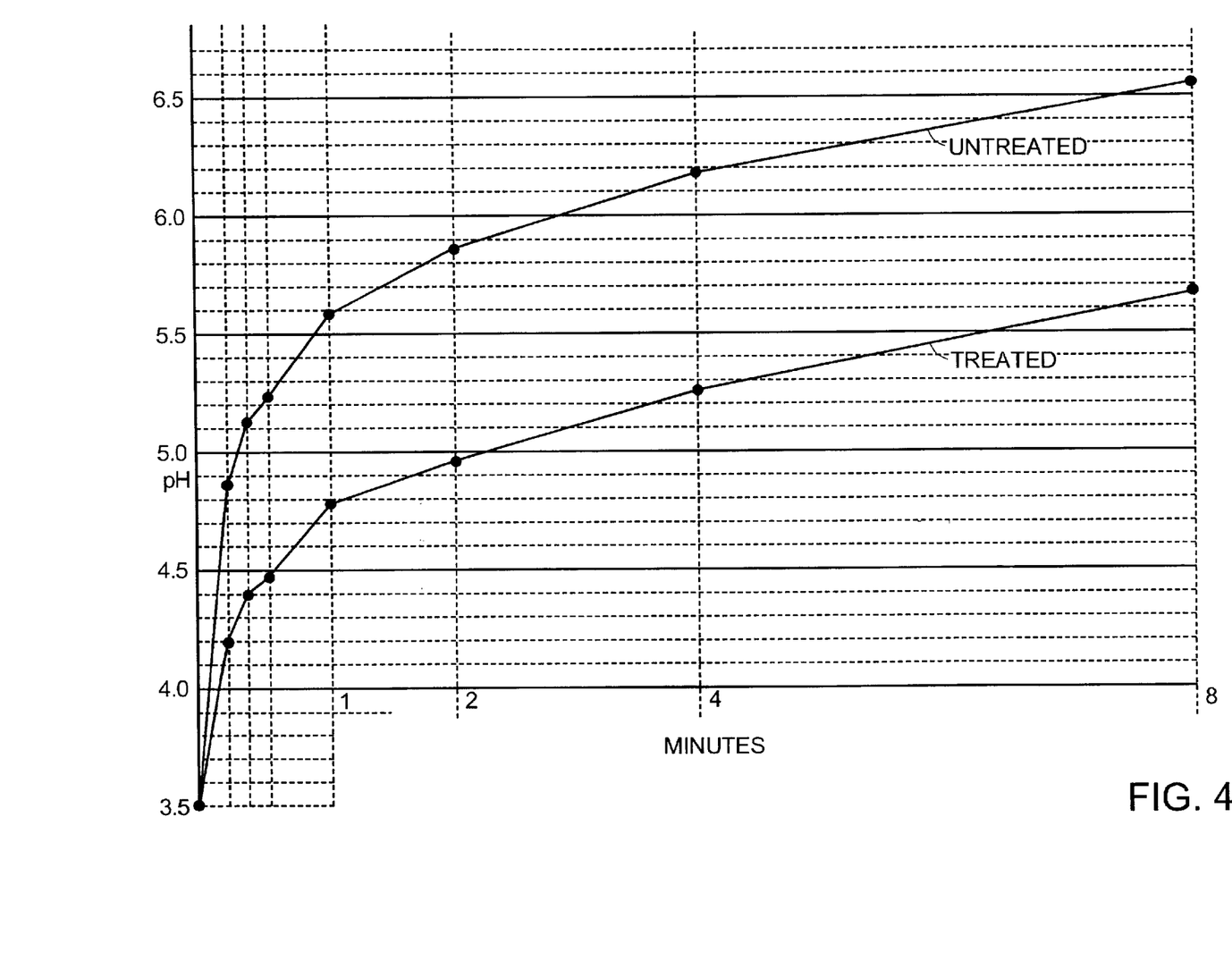

The aggregate used for this Example was the treated calcite marble aggregate from Example 7 (three baths). 4 grams of this treated aggregate was then stirred for eight minutes in 20 ml of an acid rain "simulant" composed of carbonic and sulfuric acids at room temperature (22° C.), saturated with respect to carbon dioxide. The pH of the "simulant" solution was 3.5. This is an order of magnitude more acidic than acid rain typically observed in the northeastern United States. During stirring, pH was measured as a function of time, as described in Example 7. This experiment was performed in triplicate. The same procedure (also in triplicate) was carried out on untreated aggregate and both sets of mean data (Table VI) were plotted (FIG. 4). The curve for the untreated aggregate shows a much more rapid increase in pH (indicating greater reactivity) in the first minute of exposure. The two curves are nearly parallel thereafter, with a consistent difference of approximately 0.9 pH units. As pH values are on a logarithmic scale, this represents an eight-fold reduction in sensitivity to acid exposure as a result of the conversion treatment.

TABLE VI (Refer to Example 8)

| | Treated | | Untreated | |
|---|---|---|---|---|
| Time elapsed | pH | Average deviation | pH | Average deviation |
| 10 sec | 4.18 | .05 | 4.85 | .00 |
| 20 sec | 4.36 | .05 | 5.11 | .00 |
| 30 sec | 4.46 | .04 | 5.26 | .02 |
| 1 min | 4.68 | .04 | 5.59 | .02 |
| 2 min | 4.93 | .03 | 5.87 | .04 |
| 4 min | 5.23 | .03 | 6.18 | .02 |
| 8 min | 5.61 | .06 | 6.52 | .00 |

EXAMPLE 9

More than sixty-five small cores (each 13.7 mm in diameter) were prepared from a large baluster that had been removed by the National Park Service from the Grant Memorial, in Washington, D.C. The stone was identified by petrographic microscopy as "second statuary Rutland," a calcite marble quarried near West Rutland, Vt. After 90 years of weathering, the stone was in poor condition. Five cores from the base of the baluster were tested in direct tension, using a modification of ASTM D 2936-95, which requires samples of a larger size. (Measurement of the applied tensile load was with an Imada PS 100 Mechanical Force Gauge, on a custom-built test stand.) Four pairs of base cores, with weathering surfaces intact, were adhered surface-to-surface with a structural epoxy. Each surface-coupled pair was similarly tested in tension to assess surface soundness.

For comparison, eight other cores were treated with a pH-adjusted aqueous tartrate solution of 0.175 M at a pH of 3.8 by capillarity, through the weathered surface. The solution was introduced in three thirty-second absorptions, with thirty minutes of air drying in between, followed by a one-minute capillary absorption of a saturated aqueous calcium hydroxide (secondary) solution. Treated cores were then surface-coupled and tested. They showed a mean strength increase of 124% versus the untreated cores. Utilizing the single core data for tensile failure (failure which occurred more than 20 mm below the weathered surfaces) for comparison, this increase represents a "return" to 82% of the presumed (original) soundness of the marble. In untreated condition, the core surfaces were at 37% of unweathered tensile strength. The data confirm that formation of the conversion layer, even in the absence of OH consolidation, can result in significant improvements in the cohesive properties of carbonate rocks.

EXAMPLE 10

Fourteen cores from the central portion of the marble baluster discussed in Example 9 were organized into four test groups: untreated; consolidated with Conservare OH; treated with a pH-adjusted aqueous tartrate solution of 0.175 M and a pH of 3.8; and, treated with the tartrate solution followed by the OH consolidant. Testing was in tension on surface-coupled pairs (as described in Example 9.) Treatment with the tartrate solution resulted in a mean strength increase of 75% versus the untreated pairs. Use of only OH (one cycle, performed by capillarity [per the manufacturer's current laboratory protocol]) gave a 26% increase. The sequential method (that is, conversion treatment followed by OH) resulted in an increase of 126%. The much greater increase is attributable to the attachment of the OH consolidant to bonding sites in the conversion layer.

To date, numerous badly deteriorated fragments and complete gravestones and obelisks in rural cemeteries in western New England have been treated to form conversion layers. Conversion treatment has resulted in considerable improvement of surface soundness. Field exposure studies of large groups of marble samples (both calcite and dolomite) are ongoing.

The conversion treatment is of interest for many alkaline construction industry composites including (but not limited to) those having binders of lime, of portland cement, or of lime-cement blends. For lime-based and lime-cement composites, the cured binder contains considerable amounts of calcium carbonate. This makes these materials particularly sensitive to chemical weathering. Treatment of such composites (typically mortars, stucco and plasters) results in the improvements observed for limestones and marbles, namely, the formation of bonding sites to facilitate preservation with alkoxysilane consolidants and water-repellents, accompanied by increased cohesion and acid rain resistance.

For cured cement-based composites (including cast-in-place concrete, CMUs, GFRC and architectural precast), conversion treatment serves to reduce carbonation, by reaction with the portlandite that has formed during cement hydration. (Hydroxycarboxylic acids have a history of use as admixtures in the cement products industry.) Sulfation is also reduced, by reaction with the calcium carbonate that results from carbonation.

In some instances, cement-based composites—such as concretes, decorative precast blocks and panels, and patching compounds—incorporate limestone or marble aggregates and/or fillers. These can be improved by conversion treatment as loose material prior to manufacture, to result in better in-service performance of the final product via enhanced adhesion of the cement paste, and increased acid rain resistance of these aggregates and/or fillers.

The conversion treatment, in yet another embodiment, can be utilized as a primer for alkaline calcareous masonry materials, significantly enhancing the adhesion of cementitious mortars, grouts and patching compounds. Conversion treatment can also increase the adhesion of cementitious, silicate and silicone-based paints and coatings, as well as silicone caulks, adhesives and sealants. These observable improvements are the direct consequence of the bonding sites formed by the development of the conversion layer.

The description of the specific embodiments of the methods and uses of the conversion layer for protection and consolidation of calcareous material in terms of constituents, concentrations, and methods of application and uses, is presented herein for the purposes of illustration and description. It is not intended to be exhaustive nor to limit the scope of the invention to the specific forms described herein. Although the invention has been described with reference to several preferred embodiments, it will be understood by one of ordinary skill in the art that various modifications can be made without departing from the spirit and the scope of the invention, as set forth in the claims hereinbelow.

We claim:

1. A method of forming a conversion layer on an alkaline calcareous mineral, the method comprising:
   providing an aqueous solution of a hydroxycarboxylic acid;
   adjusting the pH of the aqueous solution by adding an alkaline agent; and
   applying the pH-adjusted aqueous solution to the calcareous mineral.

2. A method according to claim 1, wherein, in providing, the aqueous solution comprises L-(+)-tartaric acid.

3. A method according to claim 2, wherein, in providing, the concentration of L-(+)-tartaric acid is within a range between approximately 0.06 mols per liter and approximately 0.25 mols per liter.

4. A method according to claim 3, wherein, in providing, the concentration is approximately 0.16 mols per liter.

5. A method according to claim 2, wherein, in adjusting, the alkaline agent comprises ammonium hydroxide.

6. A method according to claim 2, wherein, in adjusting, the pH of the adjusted solution is between approximately 2.8 and approximately 5.0.

7. A method according to claim 6, wherein, in adjusting, the pH of the adjusted solution is between approximately 3.4 and approximately 5.0.

8. A method according to claim 7, wherein, in adjusting, the pH of the adjusted solution is approximately 3.9.

9. A method according to claim 4, wherein, in adjusting, the pH of the adjusted solution is approximately 3.9.

10. A method according to claim 1, further comprising:
    rinsing the calcareous mineral with a secondary solution; wherein rinsing is performed after applying.

11. A method according to claim 10, wherein, in rinsing, the secondary solution comprises calcium hydroxide.

12. A conversion layer formed at a surface of an alkaline calcareous mineral by the method of claim 1.

13. A conversion layer formed at a surface of an alkaline calcareous mineral by the method of claim 2.

14. A conversion layer formed at a surface of an alkaline calcareous mineral by the method of claim 9.

15. A conversion layer, according to claim 13, wherein the layer comprises an alkaline earth tartrate hydrate.

16. A conversion layer, according to claim 15, wherein the layer comprises calcium tartrate tetrahydrate.

17. A method of forming a conversion layer on an alkaline calcareous mineral included in a masonry material, the method comprising:
    combining an alkaline agent and an aqueous solution of a hydroxycarboxylic acid resulting in a pH-adjusted aqueous solution; and
    applying the pH-adjusted aqueous solution to the material.

18. A method according to claim 17, wherein, in combining, the aqueous solution comprises L-(+)-tartaric acid.

19. A method according to claim 17, further comprising:
    rinsing the calcareous material with a secondary solution; wherein rinsing is performed after applying.

20. A method according to claim 18, further comprising:
    rinsing the calcareous material with a secondary solution; wherein rinsing is performed after applying.

21. A method according to claim 19, wherein, in rinsing, the secondary solution comprises calcium hydroxide.

22. A method according to claim 20, wherein, in rinsing, the secondary solution comprises calcium hydroxide.

23. A method of treating a material, the material comprising an alkaline calcareous mineral, the method comprising:
    providing an aqueous solution of a hydroxycarboxylic acid;
    adjusting the pH of the aqueous solution by adding an alkaline agent;
    applying the pH-adjusted aqueous solution to the alkaline calcareous mineral;
    forming a conversion layer on the mineral; and
    employing a formulation that chemically bonds with the conversion layer.

24. A method according to claim 23, wherein, in providing, the aqueous solution comprises L-(+)-tartaric acid.

25. A method according to claim 24, wherein, in adjusting, the pH of the aqueous solution is between approximately 2.8 and 5.0.

26. A method according to claim 24, wherein, in providing, the concentration of L-(+)-tartaric acid is within a range between approximately 0.06 mols per liter and approximately 0.25 mols per liter.

27. A method according to claim 26, wherein, in adjusting, the pH of the aqueous solution is between approximately 2.8 and approximately 5.0.

28. A method according to claim 23, further comprising:
rinsing the calcareous material with a secondary solution; wherein rinsing is performed after applying.

29. A method according to claim 24, further comprising:
rinsing the calcareous material with a secondary solution; wherein rinsing is performed after applying.

30. A method according to claim 28, wherein, in rinsing, the secondary solution comprises calcium hydroxide.

31. A method according to claim 29, wherein, in rinsing, the secondary solution comprises calcium hydroxide.

32. A method according to claim 23, wherein the conversion layer acts as a primer, enhancing adhesion of other substances to the material.

33. A method according to claim 23, wherein, in employing, the formulation comprises an alkoxysilane consolidant.

34. A method according to claim 23, wherein, in employing, the formulation comprises a water-repellent.

35. A method of treating a material, the material comprising an alkaline calcareous mineral, the method comprising:
applying a pH-adjusted aqueous solution of a hydroxycarboxylic acid to the material; and
forming a conversion layer on the mineral; such that the conversion layer acts to passivate the mineral for protection of the material against acidic attack.

36. A method according to claim 35, wherein, in applying, the pH-adjusted aqueous solution comprises L-(+)-tartaric acid.

37. A method according to claim 36, wherein, in applying, the pH of the pH-adjusted aqueous solution is between approximately 2.8 and approximately 5.0.

38. A method according to claim 35, further comprising:
rinsing the calcareous material with a secondary solution; wherein rinsing is performed after applying.

39. A method according to claim 36, further comprising:
rinsing the calcareous material with a secondary solution; wherein rinsing is performed after applying.

40. A method according to claim 38, wherein, in rinsing, the secondary solution comprises calcium hydroxide.

41. A method according to claim 39, wherein, in rinsing, the secondary solution comprises calcium hydroxide.

42. A method of treating a material, the material comprising a plurality of abutting alkaline calcareous mineral grains, the method comprising:
applying a pH-adjusted aqueous solution of a hydroxycarboxylic add to the material; and
forming a conversion layer on each of the abutting grains; such that the conversion layer consolidates the abutting grains, resulting in strengthening of the material.

43. A method according to claim 42, wherein the pH-adjusted aqueous solution comprises L-(+)-tartaric acid.

44. A method according to claim 43, wherein, in applying, the pH of the pH-adjusted aqueous solution is between approximately 2.8 and approximately 5.0.

45. A method according to claim 42, further comprising:
rinsing the calcareous material with a secondary solution; wherein rinsing is performed after applying.

46. A method according to claim 43, further comprising:
rinsing the calcareous material with a secondary solution; wherein rinsing is performed after applying.

47. A method according to claim 45, wherein, in rinsing, the secondary solution comprises calcium hydroxide.

48. A method according to claim 46, wherein, in rinsing, the secondary solution comprises calcium hydroxide.

* * * * *

UNITED STATES PATENT AND TRADEMARK OFFICE
CERTIFICATE OF CORRECTION

PATENT NO.   : 6,296,905 B1
DATED         : October 2, 2001
INVENTOR(S)  : Irving O. Slavid and Norman R. Weiss It is certified that error appears in the above-identified patent and that said Letters Patent is hereby corrected as shown below:

<u>Title page,</u>
Item [56], OTHER PUBLICATIONS, "Goins, E.S., et al." reference reads "Alokoxysilane" should read -- Alkoxysilane —
Item [73], Assignees, reads "MMC" should read -- MCC --

<u>Column 2,</u>
Line 67, reads "water-repellant" should read -- water-repellent --

<u>Column 5,</u>
Line 61, reads "towelling" should read -- toweling --

<u>Column 7,</u>
Line 32, reads "Prosoco" should read -- ProSoCo --

<u>Column 8,</u>
Line 25, reads "thie" should read -- the --

<u>Column 10,</u>
Line 21, reads "D.C." should read -- DC --

<u>Column 14,</u>
Line 20, reads "add" should read -- acid --

Signed and Sealed this

Twenty-first Day of January, 2003

JAMES E. ROGAN
*Director of the United States Patent and Trademark Office*